United States Patent
Lee

(10) Patent No.: US 7,372,844 B2
(45) Date of Patent: May 13, 2008

(54) CALL ROUTING METHOD IN VOIP BASED ON PREDICTION MOS VALUE

(75) Inventor: Dae-Hyun Lee, Suwon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 865 days.

(21) Appl. No.: 10/745,498

(22) Filed: Dec. 29, 2003

(65) Prior Publication Data

US 2004/0165570 A1 Aug. 26, 2004

(30) Foreign Application Priority Data

Dec. 30, 2002 (KR) ............... 10-2002-0087412

(51) Int. Cl.
*H04J 3/24* (2006.01)
*H04L 12/66* (2006.01)

(52) U.S. Cl. .................... 370/349; 370/352

(58) Field of Classification Search ........... 370/349, 370/352, 389, 252, 356, 395.43; 379/88.17, 379/88.2; 709/223, 224
See application file for complete search history.

(56) References Cited

U.S. PATENT DOCUMENTS

| | | | |
|---|---|---|---|
| 6,490,552 B1 | 12/2002 | Lee et al. | |
| 6,609,092 B1 | 8/2003 | Ghitza et al. | |
| 7,173,910 B2 * | 2/2007 | Goodman | 370/252 |
| 2002/0114296 A1 | 8/2002 | Hardy | |
| 2002/0167936 A1 | 11/2002 | Goodman | |
| 2002/0193999 A1* | 12/2002 | Keane et al. | 704/270 |
| 2003/0093513 A1* | 5/2003 | Hicks et al. | 709/224 |
| 2004/0057381 A1 | 3/2004 | Tseng et al. | |
| 2004/0064760 A1* | 4/2004 | Hicks et al. | 714/43 |
| 2006/0029067 A1* | 2/2006 | Conway | 370/389 |

FOREIGN PATENT DOCUMENTS

| | | |
|---|---|---|
| EP | 0 887 957 | 12/1998 |
| WO | WO 02/093894 A2 | 11/2002 |

OTHER PUBLICATIONS

*Search and Examination Report under Sections 17 & 18(3)* from the British Patent Office issued in Applicant's corresponding British Patent Application No. GB0330158.7 (dated May 24, 2004).
*Office action* frjom the State Intellectual Property Office of People's Republic of China issued in Applicant's corresponding Chinese Patent Application No. 200310124245.7 dated Nov. 25, 2005 (English language translation of the Office action is enclosed herewith).

* cited by examiner

*Primary Examiner*—William J. Deane, Jr.
(74) *Attorney, Agent, or Firm*—Robert E. Bushnell, Esq.

(57) ABSTRACT

A call routing method in VoIP (Voice over Internet Protocol) capable of performing voice service assuring best voice quality is obtained by predicting voice quality using network parameters that affect the voice quality, and then performing a call routing to a gateway with a maximum MOS (Mean Opinion Score) value out of a gateway group. Also, actively responding to organically changing network environment and providing a best call routing path for the network environment before setting up a call, best voice quality can be provided.

12 Claims, 8 Drawing Sheets

FIG. 7

| No | Access Code (701) | Access code Length (702) | Access code Delete Length (703) | Access code Insert Length (704) | Gateway Group Table 1 (705) |
|---|---|---|---|---|---|
| 0 | 051 | 3 | 3 |  | 1 |
| 1 | 0553 | 4 | 4 |  | 2 |
| 2 | 046 | 3 | 3 |  | 3 |
| .. | ... | ... | ... | ... | ... |

FIG. 8A

| No | Gateway IP Address (801) | MOS Prediction value (802) |
|---|---|---|
| 0 | 168.52.12.20 | 3.6 |
| 1 | 168.52.12.21 | 3.2 |
| 2 | 168.52.12.23 | 4.1 |
| .. | ... | ... |

FIG. 8B

| No | Gateway IP Address (803) | MOS Prediction value (804) |
|---|---|---|
| 0 | 168.52.12.40 | 3.8 |
| 1 | 168.52.12.41 | 4.2 |
| 2 | 168.52.12.43 | 2.4 |
| .. | ... | ... |

CALL ROUTING METHOD IN VOIP BASED ON PREDICTION MOS VALUE

CLAIM OF PRIORITY

This application makes reference to and claims all benefits accruing under 35 U.S.C §119 from an application entitled "CALL ROUTING METHOD IN VoIP BASED ON MOS PREDICTION", filed in the Korean Intellectual Priority Office on 30 Dec. 2002 and assigned Serial No. 2002-87412.

BACKGROUND OF THE INVENTION

1. Field of the Invention

The present invention generally relates to a VoIP (Voice over Internet Protocol), and more particularly, a call routing method based on MOS (Mean Opinion Score) prediction value for providing a highest voice quality under restricted environment by predicting voice quality over IP (Internet Protocol) using network parameters that affect the voice quality, and performing a call routing from a gateway group to a gateway with a maximum prediction MOS value.

2. Description of the Related Art

For many years, technicians have put a great deal of efforts to operate voice calls over public telephone network more efficiently and to improve voice quality. Thanks to them, the public telephone network at present is capable of supporting real-time voice services required qualities like low-propagation delay, and jitter. Users became used to the voice quality over the public telephone network, and they now agree that the voice quality is standardized.

On the other hand, IP network has been implemented by non-real time application, such as, primary file transmission and e-mail. Since the non-real time application requests broadband and bust traffic, occasional delay and jitter were not considered as serious problems.

If public telephone network and IP network were integrated, the IP network would have to go through conversion to a net architecture for assuring QoS (Quality of Service) for voice services. Because the Internet is based on a packet switching system, there are various kinds of parameters that affect speech quality. Also, speech quality is easily deteriorated by many factors involved in net interworking between public telephone network and Internet.

To utilize Internet bandwidth more efficiently, voice data is often compressed for transmission. Nonetheless, voice quality was deteriorated no matter what kind of transmission system was used. Especially, when the voice data was compressed more than twice in a row, the voice quality was deteriorated considerably.

Compressor/decompressor (codec) systems and digital signal processing (DSP) are commonly used in voice communications because they conserve bandwidth. But they also degrade voice fidelity. The best codecs provide the most bandwidth conservation while producing the least degradation of the signal. Bandwidth can be measured using laboratory instruments, but voice quality requires human interpretation.

Also, voice data is very sensitive to delay. In general, most users start complaining about voice quality when network (transfer) delay totals 150-200 ms.

Network delays include propagation delay and handling delay. The propagation delay usually occurs in the network using optical fiber or copper as a medium. The handling delay occurs primarily because communication equipment that processes information takes more than necessary time to input and output information, and the handling delay includes codec delay and queuing delay.

Besides the propagation delay and the handling delay, jitter is another factor that has a great impact on the voice quality. Jitter is a deviation between predicted voice data packet to be received and actually received packet. For instance, suppose that a transmitter transmitted packets A, B, and C at a regular time interval (i.e. $D_1$). However, a receiver may not receive the packets A, B and C at regular time intervals because the propagation delay and the handling delay change depending on the traffic state of network.

Jitter deteriorates the quality of voice data substantially when the interval between data is not uniform. As an attempt to solve the jitter, communication equipment establishes a jitter buffer to uniform the packet interval. The jitter is found more frequently in data communication equipment, such as, a router or a frame relay switch, which disregards jitter when managing traffic and handles voice data using the same method with that of general data.

Above all, echo is probably one of the factors that have the greatest influence on voice quality. Echoes occur because of the impedance difference between a 4-wire switch to a 2-wire switch on the conventional long-distance telephone network.

Most people feel secure when they hear their own voices through a handset while talking on the phone. However, if they hear their voices echo after 25 ms, they would not feel the same way. Rather, the echoes interfere their conversation. Introduced to get rid of this echoing problem is an echo canceller, which stores negative inverse image for a certain period of time and deletes data being echoed among the received data.

Echo canceller is limited by a total waiting time for an echoed voice. This time is called echo trail. In general, about 32 ms is long enough for the waiting time.

Meanwhile, the most important thing to be considered for designing the VoIP network is limiting its bandwidth. Bandwidth varies depending on the kind of codec and the number of frames per packet. For example, suppose that two 10 ms G.729 voice frames are loaded into a single packet using 8 kbps G.729 codec. However, 24 kbps of bandwidth is actually needed in this case. Although each frame would require 20 bytes because each G.729 voice packet is in 10 bytes, IP (Internet Protocol), RTP (Real-Time Transport Protocol) and UDP (User Datagram Protocol) headers in 40 bytes are required for each packet. In this case, even though header overhead of a data link layer (e.g. PPP (Point-to-Point Protocol), Frame Relay, Ethernet etc.) is not included, the header overhead is twice of the voice payload. Therefore, 24 kbps of bandwidth is appropriate only for a high-speed transmission circuit like T1 (1.544 Mbps) or E1 (2.048 Mbps), but it is rather a burden on a low-speed transmission circuit like 56 kpbs.

RTP is an Internet standard protocol for transmitting real-time data including voice and video over the IP network. RTP is composed of a data part and a control part called RTCP. RTP supports real-time application programs like audio or video programs, and has several functions, e.g. timing reset, loss detection, contents identification and so forth. RTP supports QoS as well as synchronization of diverse media streams at a destination.

In addition, RTP generates a 20-byte payload under a packet voice environment (G.729) where a voice frame is sampled every 20 ms. The voice packet at this time is composed of IP header (20 bytes), UDP header (8 bytes), RTP header (12 bytes), and payload (20 bytes). Because 40-byte header is twice bigger than the payload, the header uses up a majority part of the bandwidth while generating a packet every 20 ms. To eliminate waste of header, there is a method called CRTP (Compressed RTP). As the name implies, CRTP involves compressing the header.

Particularly, the CRTP method is good for the low-speed transmission circuit since it reduces available bandwidth, such as, from 24 kbps to 11.2 kbps. For instance, if CRTP is used in 56 kbps transmission circuit, only four G.729 VoIP calls can be dealt with. According to the CRTP method, if UDP checksum is not sent to IP/UDP/RTP header, the header is reduced to 2 bytes, and if the UDP checksum is used, the header is reduced to 4 bytes.

The CRTP method is pretty much similar to the TCP (Transmission Control Protocol) header compression method. Both are based on the idea that the content difference between two packets is same although header of every packet varies in diverse fields. A primary difference between an uncompressed header and a session is shared between a compressor and a decompressor. In case a secondary difference of every thing to be transmitted is 0 (zero), the decompressor, upon receiving each compressed packet, adds the primary difference to the uncompressed header being stored. As a result, the original header can be reestablished without losing any information.

Similar to TCP/IP header compression where a plurality of TCP connections is shared at the same time, it is important to maintain a plurality of session environments in IP/UDP/RTP. Generally, session environment is defined as a combination of IP source and destination addresses, UDP source and destination ports and RTP SSRC (Synchronization Source) field, etc. A compression system applies a hashing function to this type of field and indexes a pre-stored session environment table.

A compressed packet has a small integral called SCID (Session Context Identifier), and with the help of this, one can find out a session environment whose packet needs to be interpreted. The decompressor indexes the pre-stored session environment table using this SCID.

In most cases, CRTP can compress a 40-byte header to a 2-4 byte header. If a particular field is changed in the IP/UDP/RTP header, the header cannot be compressed because the content of the header is not the same. In other words, if a change is made in a filed like the payload, the original uncompressed header should be transmitted. To the CRTP, bandwidth is the main issue, so it is highly recommended to a WAN interface with many RTP traffics.

In a high-speed backbone network, however, transmission quantity and transmission speed are very high. Hence, the CRTP is not appropriate in this case because of the compression/decompression process overhead.

Meanwhile, there is a multiframe transmission method as an example of bandwidth managing methods. As the name implies, plural frames are transmitted together in order to reduce overhead of each kind of header. If the RTP payload can be transmitted using this method, it is possible to reduce the bandwidth that is actually used by the RTP payload.

When constructing a frame, one cannot simply ignore the bit occupied by each header. Considering cell transmission efficiency, it is better to transmit a plurality of data cells under one header than to transmit each data cell under one header.

In case of G.723.1, up to three (90 ms) can be transmitted as a multiframe. Meanwhile, in case of G.729A, up to 9 (90 ms) can be transmitted as a multiframe. For jitter buffering of a H.323 endpoint terminal receiving a voice packet, at least two (180 ms) (e.g. multiframe) frames need to be buffered. This is because H.323 Spec limits the terminal delay to no more than 180 m.

As such, 3 or 9 frames are packed together for transmission. Although it is possible to pack more frames as needed, in such case, transmission delay occurs as aforementioned. Hence, it is recommended to pack the appropriate number of frames. For instance, in case of G.723.1, 2 or 3 frames are packed together and transmitted in a multiframe structure. Also, in case of G.729A, a maximum of 9 frames are packed and can be transmitted in a multiframe structure.

According to the dynamic jitter buffering method, CRTP, and multiframe method of the related art, however, each processor is operated individually following a predetermined method, provided a call route is established. Therefore, the methods of the related art are not able to respond to organically changing network environment more actively, and as a result, voice quality based on those methods is not good.

Moreover, the above methods of the related art provide only organically treated voice quality by the RTP packet under the influence of network after the call setup is completed, depending on a predetermined call routing path. Hence, voice quality based on those methods is very limited.

In recent voice communications, particularly Internet telephony, a mean opinion score (MOS) provides a numerical measure of the quality of human speech at the destination end of the circuit. The scheme uses subjective tests (opinionated scores) that are mathematically averaged to obtain a quantitative indicator of the system performance. The following U.S. patents utilize mean opinion score (MOS): U.S. Pat. No. 6,490,552 to K. Y. Martin Lee et al. entitled "Methods and Apparatus for Silence Quality Measurement" and U.S. Pat. No. 6,609,092 to Oded Ghitza et al. entitled "Method and Apparatus for Estimating Subjective Audio Signal Quality from Objective Distortion Measures," and are incorporated by reference herein.

SUMMARY OF THE INVENTION

It is, therefore, an object of the present invention to provide a call routing method based on prediction MOS value capable of providing a high voice quality and coping with changes in network environment more effectively, by providing a call routing path based on prediction MOS value using network parameters that are dependent on network environment.

Another object of the present invention is to provide a call routing method capable of providing appropriate voice quality in response to changes in network environment by performing call routing before call setup is completed and by providing more selection to routing paths in order to meet network environment changes, To achieve the above object, there is provided a method for predicting voice quality, the method including: a first step for obtaining an equation for getting a prediction MOS (Mean Opinion Score) value based on a regression analysis using a voice quality measuring system, the system being mounted with a plurality of personal computers of originating/receiving sides where each of the personal computers has a built-in sound card and a voice sample, IP phones, gateways, and a network parameter emulator; a second step for obtaining, at a gateway over VoIP network, a prediction MOS value using a ping system, by first obtaining a packet delay, a packet loss, a packet length, and a jitter value for respective destination gateways, and applying the equation for getting a prediction MOS value to obtain the prediction MOS value for each of the destination gateways.

Another aspect of the present invention provides a call routing method in VoIP, the method including: a first step for obtaining, at an arbitrary gateway, a final prediction MOS (Mean Opinion Score) value by obtaining a prediction MOS value from an equation for getting a prediction MOS value, receiving a prediction MOS value from a plurality of destination gateways, and obtaining the final prediction MOS value based on the prediction MOS value from the equation and the prediction MOS value that is transmitted from the plurality of destination; a second step for constructing, at the gateway, a gateway routing table having designated gateway group table numbers in accordance with access codes, and for constructing a gateway group table having a gateway IP address field for each gateway group and a prediction MOS value field for designating the final prediction MOS value (prediction MOS value); and a third step, when performing a call routing to a gateway group under an access code, for performing, at the gateway, the call routing to a gateway with a maximum prediction MOS value, the gateway with the maximum prediction MOS value being one of gateways in gateway groups that are grouped in accordance with access codes.

Another aspect of the present invention provides a call routing method in VoIP, the method including: a first step for obtaining an equation for getting a prediction MOS (Mean Opinion Score) value based on a regression analysis using a voice quality measuring system, the system being mounted with a plurality of personal computers of originating/receiving sides where each of the personal computers has a built-in sound card and a voice sample, IP phones, gateways, and a network parameter emulator; a second step for obtaining, at a gateway over VoIP network, a prediction MOS value using a ping system, by first obtaining a packet delay, a packet loss, a packet length, and a jitter value for respective destination gateways, and applying the equation for getting a prediction MOS value to obtain the prediction MOS value for each of the destination gateways; a third step for obtaining, at a gateway, a final prediction MOS value based on the prediction MOS value obtained from the equation and a prediction MOS value that is transmitted from the plurality of destination gateways; a fourth step for constructing, at the gateway, a gateway routing table having designated gateway group table numbers in accordance with access codes, and for constructing a gateway group table having a gateway IP address field for each gateway group and a prediction MOS value field for designating the final prediction MOS value (prediction MOS value); and a fifth step, when performing a call routing to a gateway group under an access code, for performing, at the gateway, the call routing to a gateway with a maximum prediction MOS value, the gateway with the maximum prediction MOS value being one of gateways in gateway groups that are grouped in accordance with access codes.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 7 is a structural diagram of a gateway routing table to which the present invention is applied;

FIGS. 8A and 8B are structural diagrams of gateway group tables to which the present invention is applied.

DETAILED DESCRIPTION OF THE PREFERRED EMBODIMENT

Figure 1:
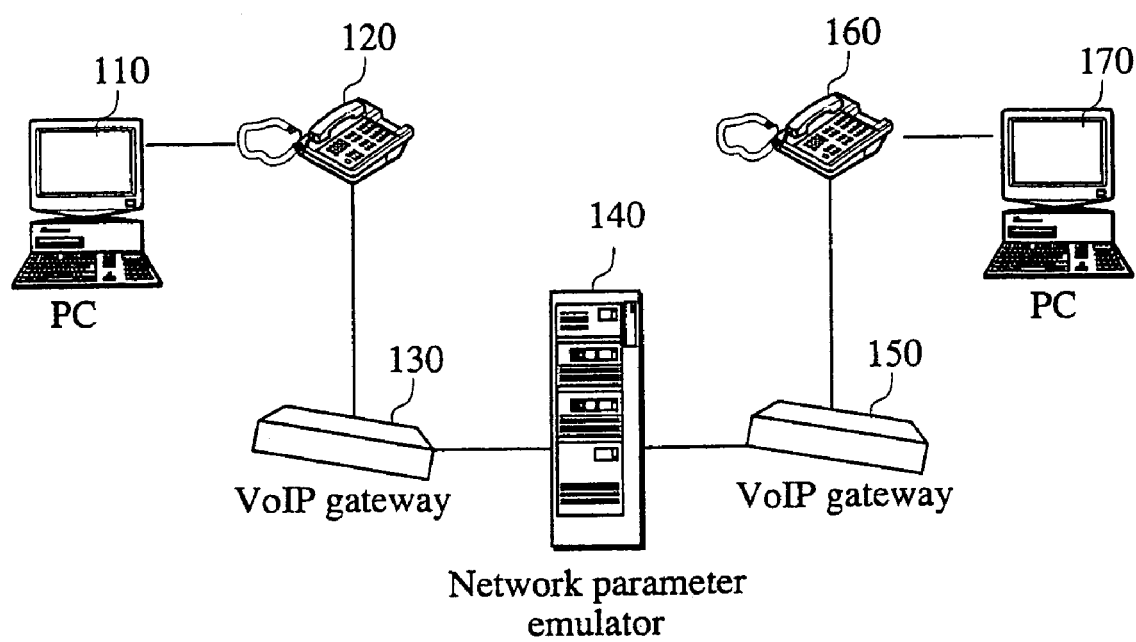
FIG. 1 is a schematic diagram of a voice quality measuring system for predicting voice quality in response to a change in network parameters according to the present invention.

A preferred embodiment of the present invention will be described herein below with reference to the accompanying drawings. In the following description, well-known functions or constructions are not described in detail since they would obscure the invention in unnecessary detail.

The present invention provides a call routing method based on prediction MOS (Mean Opinion Score) values using network parameters that affect voice quality over an IP network, such as, packet loss, jitter, packet delay and packet size, to provide best voice quality by expanding the scope of load sharing.

Traditionally voice quality has been tested based on the measurement of SNR (Signal to Noise Ratio) using a waveform of a voice signal on an instrument screen, and THD (Total Harmonic Distortion). These measuring methods are very useful especially when the voice signal gets distorted by various factors.

However, the methods are not appropriate for low-bandwidth codec systems like G.729 and G.723.1, the most frequently used systems in VoIP, because an original voice waveform is not conserved. Such voice coder codecs are usually focused on reproducing subjective voice sound, rather than the shape of voice waveform. Therefore, the traditional methods are not effective for the VoIP network using low-bandwidth codecs, and other testing methods suitable for the IP network having data burst and QoS problems are required.

Because of the subjective nature of voice quality, many listeners were able to evaluate the voice quality over environment where it is perfectly defined and managed. This method was believed reliable in a sense that users who are accustomed to voice calls personally test voice quality, and for that reason, the method has been used for many years. ITU-T P.800 defined this as MOS (Mean Opinion Score).

To determine MOS, a number of listeners rate the quality of test sentences read aloud over the communications circuit by male and female speakers. A listener gives each sentence a rating as follows: (1) bad; (2) poor; (3) fair; (4) good; (5) excellent. The MOS is the arithmetic mean of all the individual scores, and can range from 1 (worst) to 5 (best).

However, MOS measurement took a great deal of time and expense and its procedure was more complicated than necessary. Introduced to overcome these shortcomings was ITU-T P.861 PSQM (Perceptual Speech Quality Measurement). PSQM was developed particularly for evaluating voice codecs. According to this method, all sounds within a voice bandwidth are subject to an objective measurement including distortion, noise effect, and a degree of overall perceptual faithfulness.

To this end, PSQM has a very distinct and clear voice sample, and the sample is transmitted to a receiving side which is supposed to collect the transmitted voice sample.

In this case, how the listener perceives the collected voice quality is an important issue. Based on perceptual reference of the listener, PSQM, through algorithm, provides an objective result telling how much the collected sample has been distorted from the original voice sample. Also, PSQM tells whether the collected voice signal is better or worse than the original voice sample. Because of this repetitive and objective nature of the PSQM method, PSQM score, similar to the MOS method, can represent large audiences.

As describe before, PSQM was originally developed for measuring (or testing) voice quality under the influence of voice compression codec, but problems like packet loss over the IP network was not reflected on the PSQM score, as it should have been. That is why PSQM+(Enhanced version of PSQM) was developed.

Also, there is another new model called PAMS (Perceptual Analysis Measurement System). PAMS uses a similar perceptual model used in PSQM, providing a repetitive and objective system for measuring voice quality. Yet, PAMS uses a more effective signal processing model and provides different kinds of score, namely 'Listening Quality Score' and 'Listening Effort Score'. These scores are closely related to MOS scores, and the same scoring scale, such as 1 to 5, is used.

PESQ (Perceptual Evaluation of Speech Quality), on the other hand, measures objective speech quality based on human perceptual factors, conforming to ITU P.862 Standard, and provides the score of speech quality by relating it to a subjective test result. PESQ is an enhanced perceptual quality measurement for voice quality in telecommunications. PESQ was specifically developed to be applicable to end-to-end voice quality testing under real network conditions, like VoIP.

At the meeting of ITU-T Study Group 12 in February 2001, PESQ was officially approved as new ITU-T recommendation P.862, and is meant to be the successor of ITU-T P.861/PSQM. PESQ was developed by combining the two advanced speech quality measures PSQM+ and PAMS.

Network parameters required for prediction MOS include packet size, packet loss, packet delay, and jitter.

Among others, packet loss affects clarity of voice. Packet loss is usually caused by the traffic bottleneck phenomenon over the IP network.

For this reason, most IP networks have a means for checking network state through packet loss. In other words, finding out to which link in the network the bottleneck phenomenon occurs, a congestion control process is performed to reduce the number of packets to be transmitted. Packet loss can be a fatal problem especially when important data is being transmitted/received. As such, TCP, for instance, retransmits the data to obviate such problem.

When a real-time application like VoIP is concerned, retransmission is not possible since UDP, not TCP, is used for transmitting media. Besides, a packet not being arrived in a certain time is regarded as packet loss, and the speech quality is deteriorated by voice packet loss.

When a packet is lost, no voice data processing can be done on that part, and as a result, a user hears nothing. If packet loss occurs continuously or frequently, the speech quality is severely deteriorated. To prevent the speech quality from being deteriorated by packet loss, some used PLC (Packet Loss Concealment) method. According to the PLC method, when a packet is lost, a previous packet is reproduced so the user (or the receiver) does not even realize that there has been packet loss because there would be no silent moment to the receiver. However, it turned out that this method is effective only when a single packet is lost. When a plurality of packets is lost at once, the method was useless. In fact, PLC method is now being used in a low-bandwidth codec.

Meanwhile, when a non-real time application like FTP is concerned, packet loss is not a fatal problem and it can be easily fixed by retransmitting the packet having been lost. However, in the real-time application like VoIP, a voice signal is not established until a packet is received within a designated time, so in this case, packet retransmission only causes additional delay.

This is why a new mechanism is required for assuring least performance while preventing packet loss in the real-time application.

The mechanism should be capable of minimizing delay in traffic with high priorities, e.g. voice, and packet loss. To this end, a variety of routing mechanism has been tried.

For example, there are WFQ (Weighted Fair Queueing), MPLS (Multi-Protocol Label Switching) tagging, and using IP headers in ToS (Type of Service) bit. To apply these mechanisms, a network manager should construct an appropriate network and determine priorities of services and select kinds of resources to be assigned to each service. In addition, as for dynamically assigning resources to the services, a VoIP terminal or a RSVP (Resource Reservation Protocol) that accepts an IP QoS request of gateway can be used.

Unlike packet loss, packet delay affects voice quality. When having a voice call over the VoIP network, the actual end-to-end delay is the time taken for a receiver to get a voice signal from a transmitter (or an originator).

In general, the end-to-end delay over the VoIP network can be categorized into two: IP network delay and VoIP equipment delay.

IP network delay can be classified into propagation delay that is usually caused by luminous flux in network using optical fiber or copper; serialization delay due to the time taken to accurately locate voice data bit or byte into interface; and handling delay.

Here, the handling delay can be subcategorized into three kinds of delay: packet handling delay due to the time taken to receive an entire packet through a router and to transmit the packet; packet switching/router delay due to the time taken for the router to switch/route the packet; and queuing delay that occurs in an input port and an output port of the router when doing packet switching/routing because of irregular arrivals of packets of the IP network and speed limit of a channel (or a transmission line).

The VoIP equipment delay occurs during the voice signal process that is performed in a VoIP gateway and receiving/transmitting parts of a VoIP terminal. This delay includes codec delay time, that is, the time taken to encode an analog signal to a digital signal or to decode a digital voice signal to an analog voice signal. Depending on kinds of codecs, more time can be taken to compress a voice signal, resulting additional delay. To be short, as a compressing procedure is complicated, it only extends delay.

Moreover, packet delay occurs in the transmission part of the VoIP equipment. Packet delay indicates the time taken to insert voice data into a packet. Therefore, if a packet size is large, it takes longer to insert voice data in the packet. However, a small packet, although it can reduce packet delay, deteriorates a bandwidth efficiency of the VoIP network because of an unnecessary header. For example, approximately 20 ms of algorithm delay can occur in G.729, and DSP would generate a frame every 10 ms.

Suppose that two voice frames are loaded into one packet. Then packet delay in this case is 20 ms. In fact, how many frames should be allocated to one packet is a research project in itself. DSP, in addition to its packet conversion function, is in charge of the assignment, to reduce the router's overhead.

For instance, RTP header handles frames at DSP. Thus, the router does not have to handle frames of the RTP header. Delays over the IP network occur mainly because of queuing delay and the time taken to transfer a real packet to output queuing.

As discussed above, the router's queuing delay has the greatest impact on the end-to-end delay over the VoIP network. The above-described delays explain why jitter phenomenon, which is caused by irregular packet arrival intervals, occurs in the network.

If a voice packet is played out anyway as soon as the voice packet is arrived, while the jitter problem being unresolved, the voice quality will be substantially deteriorated and the receiver only hears the sound that cannot be easily recognized. Therefore, the receiving side should be able to play out the voice packet in the form of a regular voice data flow. There are three methods to do so. Particularly, the following explains how the receiving side can play out the voice packet like a regular voice data flow.

First, it is known that each voice packet has a sequence number. Hence, whenever a voice packet is generated, the transmitter (or originator) increases the sequence number one by one and loads the number into the packet and informs the receiver the sequence of the packet.

Second, it is known that each voice packet has a time stamp. When a voice packet is generated, the transmitter loads the time into the packet and transmits the packet to the receiver, helping the receiver to be able to measure delay time.

Third, the receiver delays the time for playing out the voice packet. The receiving side should delay play-out time to help most packets to be arrived by a predetermined play-out time.

Delay in play-out time can be fixed during a conversation or varied in response to different circumstances. However, packets that are not arrived within the predetermined play-out time are considered to be lost. There have made attempts to back up those lost voice packets and to remove this jitter phenomenon, for example, 'fixed play-out delay' method and 'dynamic play-out delay' method.

In the meantime, each function in an upper level, the function being processed in a gateway, affects a plurality of delays caused at the gateway. Here, the plurality of delays described as follows:

1) Network interface delay: Network interface includes software or hardware to be connected to a public telephone network or a network;

2) DSP handling delay: DSP handling is one of the most complex functions of a gateway. In general, DSP performs voice encoding and decoding, tone sensing, muting sensing, echo cancellation, tone generation, comfort noise generation, and so forth; and 3) Packet handling delay: A compressed voice frame goes through a DSP processing and a buffering process. Then voice data is made in a packet unit to be transmitted over the IP network.

FIG. 1 is a schematic diagram of a voice quality measuring system for predicting voice quality in response to changes of network parameters according to the present invention.

As illustrated in FIG. 1, the voice quality measuring system for predicting voice quality in response to changes of network parameters includes personal computers 110 and 170 of an transmitting side and a receiving side, each of personal computers 110 and 170 having a built-in sound card, IP phones 120 and 160 of the originating and receiving sides, VoIP gateways 130 and 150 of the transmitting and receiving sides, and a network parameter emulator 140.

The personal computer of the transmitting side 110 stores a voice sample for measurement of voice quality, and repeatedly sends this voice sample to the IP phone 160 of the other party using the IP phone 120 on its side. To perform the measurement of voice quality, voice samples are collected from two of Korean male speakers and two of Korean female speakers, in accordance with "Multi-Lingual Speech Database for Telephonometry 1994" of NTT-AT conforming to the standards for format and recording suggested by ITU-T Rec. P.830 and ITU-T Rec. P.800, and the voice samples are sent repeatedly.

The personal computer of the receiving side 170 has a built-in program for MOS measurement, such as, PAMS, PSQM, or PESQ. In this particular embodiment, PESQ was used to measure voice quality of the voice sample that is sent from the personal computer of the transmitting side 110.

VoIP gateways 130 and 150 are voice encoders using a bandwidth of 6.3 kbps based on G.723.1 or 8.0 kbps based on G.729A.

The role of the VoIP gateways 130 and 150 for interworking the Internet and the public telephone network can be summarized in two as follows:

First, the VoIP gateway is involved in the inter-transformation between the media of the public telephone network and IP packets of the Internet. The gateway 130 or 150 transforms video and audio data format between the Internet and the public telephone network to be appropriate for the interworking between those two networks. For instance, the gateway 130 or 150 transforms a voice packet of Internet calls, wherein G723.1 or G.729 voice codec is usually used, to G.711 conforming to the public telephone network. For the other case, the gateway 130 or 150 transforms a voice in G.711 format to a G.729 voice packet.

Second, the VoIP gateway is involved in the signaling conversion, or inter-conversion between a call signaling protocol, e.g. SS7 (Signaling System 7), in the public telephone network and an IP signaling protocol, e.g. H.323 or SIP. To be able to support supplementary service in the public telephone network and to be connected to a mobile radio communication network, it is essential that the gateway support the SS7 protocol.

On the other hand, the network parameter emulator 140 varies network parameters, such as, packet delay, packet loss or jitter phenomenon, in an input packet from the VoIP gateway 130 and outputs the packet. In this manner, one can find out how MOS values change in relation to changes of network parameters.

More specifically, the network parameter emulator 140 changes jitter values to 0, 2, 4, 6, 8, 10, 15, 20, 30, 40, 50, 60, and 70 [ms] and changes packet loss to 0, 2, 4, 6, 8, 10, 20, 30, 40, and 50[%] while setting the mean delay time to 150 ms.

These network parameters are established based on actually measured data (measuring data). The measuring data is obtained by measuring ping between a national site and an international side, so it is largely divided into national data and international data.

Because each data is measured at different times and dates, their network traffics are also different from each other.

Overall, the mean delay time for both the national and international data ranged 15-350 ms, with the standard deviation of the delay time being in the range of 0-70 ms and pass loss being in the range of 0-50%.

In general, national network situation proved relatively better than international network environment. For example, the values of time delay, jitter and packet loss rate for the national data were small though, and packet loss rate for the international data was great, compared to that of the national data.

In the present invention, 50 of the national data and 20 of the international data were collected for comparing network situations between the two. Time interval from 0 to 20 ms where jitter values are frequently observed was set much closer than for the rest of the standard deviation range 20-70 ms.

Also, time interval for the packet loss rate in the range of 0-10% was much closer than the rest 20-50%, to sample the network situations.

Figure 2:
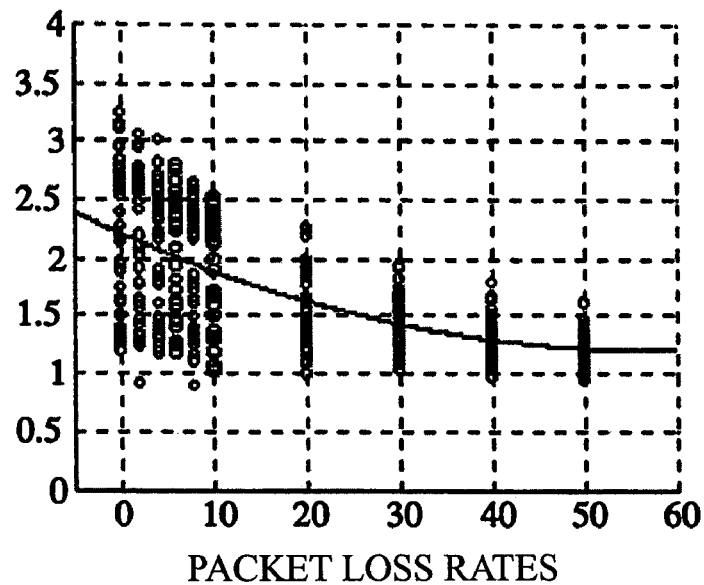
FIG. 2 is a graph illustrating measured MOS values in relation to packet loss according to the present invention.

FIG. 2 is a graph showing a relation between packet loss rates and prediction MOS values according to the present invention. In FIG. 2, X-axis represents packet loss values (rates) and Y-axis represents prediction MOS values. The measurement of MOS values was done by the network parameter emulator while changing jitter value for each packet loss value.

From the shape of the graph shown in FIG. 2, one can set up a quadratic equation to get prediction MOS values depending on packet loss values, based on the measured MOS values. That is, using a quadratic linear regression equation, the following (Equation 1) can be obtained, and the results are plotted on the graph shown in FIG. 2.

$$MOS=\beta_1 PLoss^2+\beta_2 PLoss+\beta_0 \quad \text{[Equation 1]}$$

in which, $\beta$ is a constant and can be obtained using the measured MOS value, and Ploss denotes a packet loss rate.

Figure 3:
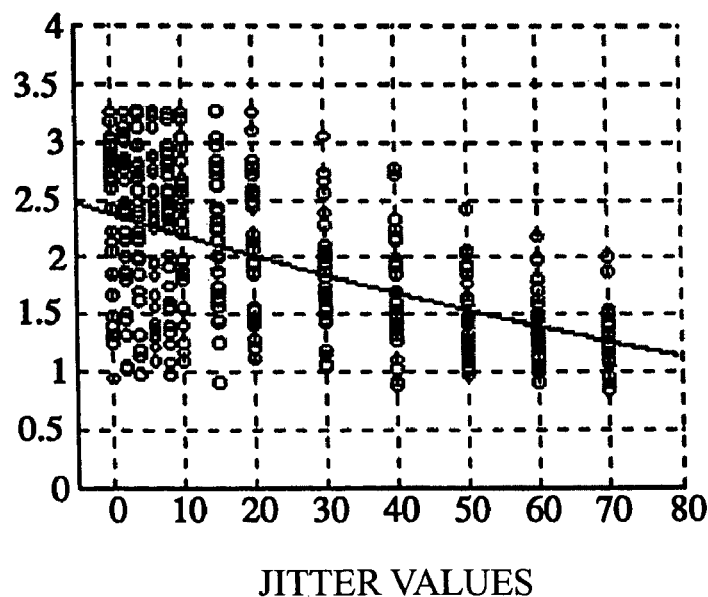
FIG. 3 is a graph illustrating measured MOS values in relation to jitter according to the present invention.

FIG. 3 is a graph showing a relation between jitter values and measured MOS values.

In the drawing, X-axis represents jitter values, and Y-axis represents measured MOS values. The measurement of MOS values was done by the network parameter emulator while changing packet loss value for each jitter value.

From the shape of the graph shown in FIG. 3, one can set up a quadratic equation to get prediction MOS values depending on jitter values, based on the measured MOS values. That is, using a quadratic linear regression analysis equation, the following (Equation 2) can be obtained, and the results are plotted on the graph of FIG. 3.

$$MOS=\beta_1 Jitter^2+\beta_2 Jitter+\beta_0 \quad \text{[Equation 2]}$$

in which, $\beta$ is a constant and can be obtained using the measured MOS value, and Jitter denotes a jitter value.

Figure 4:
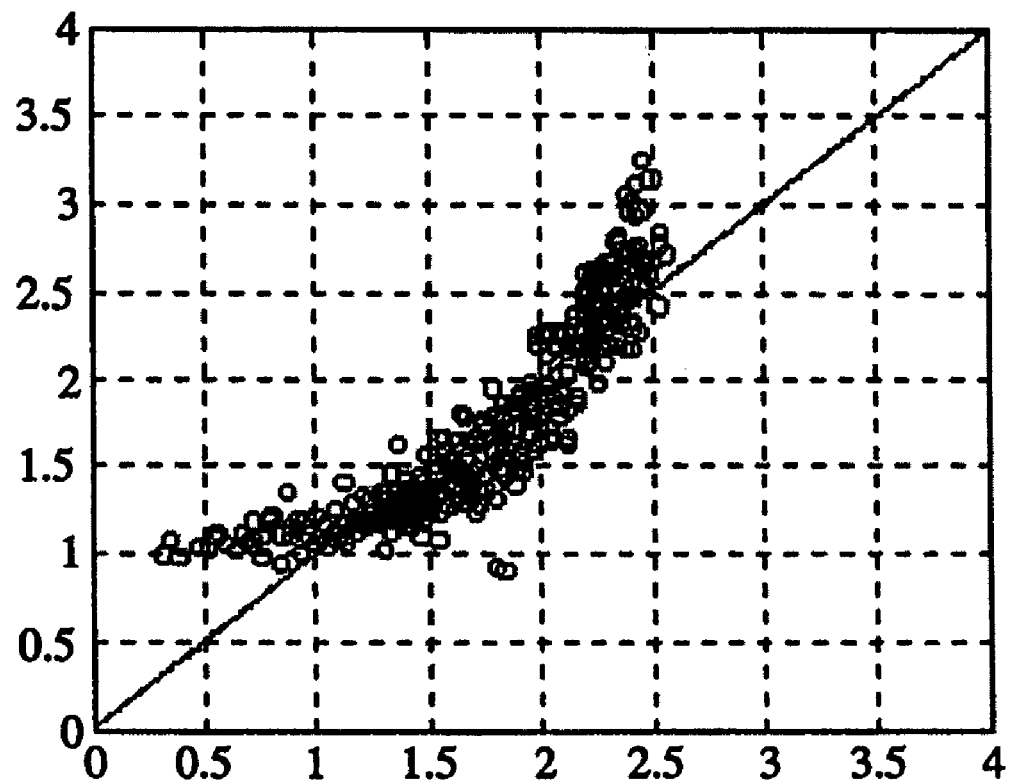
FIG. 4 is a graph illustrating measured MOS values in relation to packet loss and jitter according to the present invention.

FIG. 4 is a graph showing that how measured MOS values change according to different packet loss values and jitter values.

In the drawing, X-axis represents measured MOS values, and Y-axis represents prediction MOS values. The measurement of MOS values was done by the network parameter emulator while changing packet loss value for each jitter value.

From the shape of the graph shown in FIG. 4, one can set up a simple equation to get prediction MOS values depending on jitter and packet loss values, using the measured MOS values. That is, using a simple linear regression analysis equation, the following (Equation 3) can be obtained, and the results are plotted on the graph of FIG. 4.

$$MOS=\beta_1 PLoss+\beta_2 Jitter+\beta_3 PSize+\beta_0 \quad \text{[Equation 3]}$$

in which, $\beta$ is a constant and can be obtained using the measured MOS value; Ploss denotes a packet loss rate; Jitter denotes a jitter value; and Psize denotes a packet length.

On the other hand, the Equation 4 below is obtained, in which the actual $\beta$ values are obtained applying the measuring MOS values obtained using the G.729A voice encoder.

$$MOS=-0.021 PLoss-0.017 Jitter+0.036 PSize+2.462 \quad \text{[Equation 4]}$$

Similarly, the Equation 5 below is obtained, in which the actual $\beta$ values are obtained applying the measuring MOS values obtained using the G.723.1 voice encoder.

$$MOS=-0.030 PLoss-0.016 Jitter+0.084 PSize+2.691 \quad \text{[Equation 5]}$$

Meanwhile, the correlation coefficient between the prediction MOS values and the measuring MOS values obtained through the Equation 4 is 0.908, and the correlation coefficient between the prediction MOS values and the measuring MOS values obtained through the Equation 5 is 0.91.

Figure 5A:
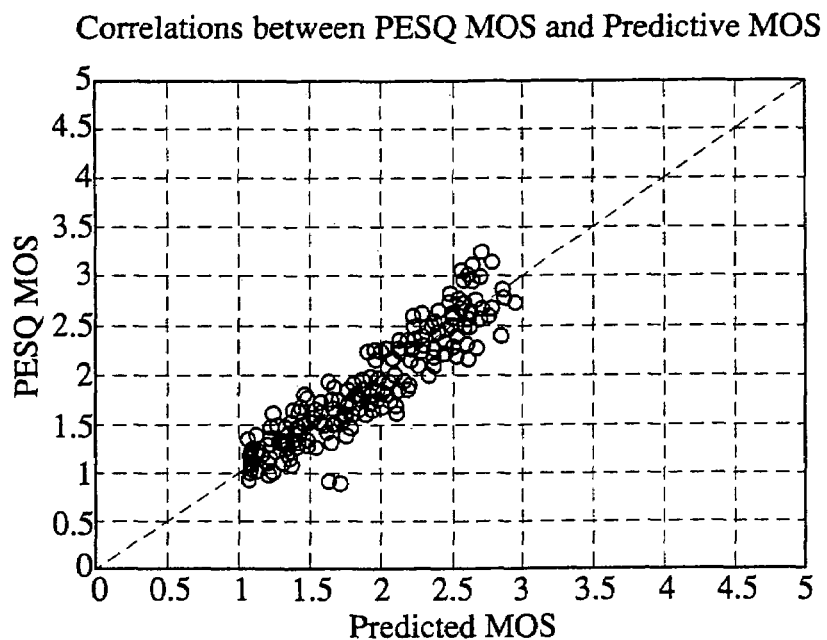
FIGS. 5A and 5C show a relation between effective MOS values and prediction MOS values.

From the results, it was discovered that a simple regression analysis equation was not adequate for the prediction MOS values to represent the measuring MOS values. As such, a quadratic regression analysis was needed. This was accomplished by having a MOS value of the Equation 4 as a variable. Equation 6 below is the quadratic regression analysis equation derived therefrom. Based on the Equation 6, the graph of FIG. 5A, which shows a relation between measuring MOS values (PESQ MOS) and prediction MOS values, was obtained.

$$MOS=0.444 Y^2-0.581 Y+1.226 \quad \text{[Equation 6]}$$

in which, Y is substituted by a MOS value obtained from the Equation 4. The correlation coefficient between the measuring MOS values and the prediction MOS values in this case was 0.9495. From this, one can conclude that the prediction MOS values are substantially close to the measuring MOS values.

Figure 5B:
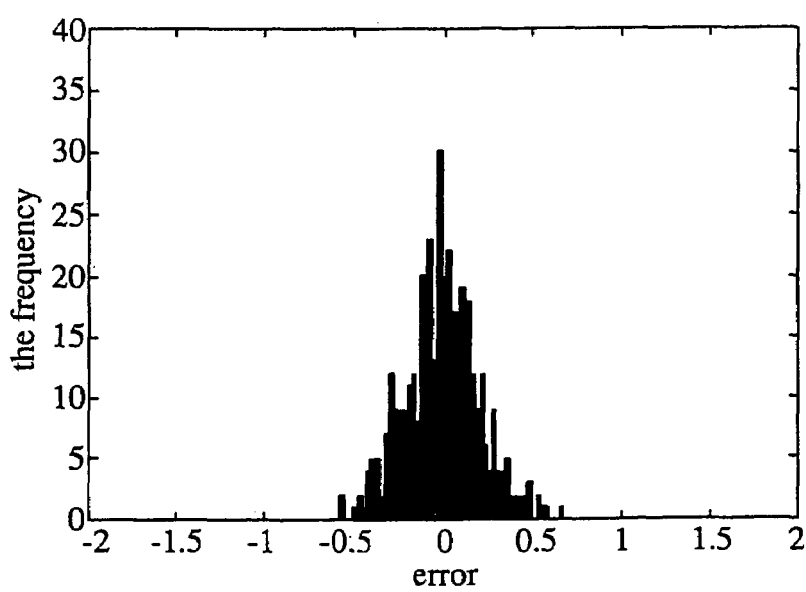
FIGS. 5B and 5D are distribution curves of deviation between effective MOS values and prediction MOS values.

FIG. 5B is a distribution curve of deviation between measuring MOS values and prediction MOS values. As depicted in the drawing, the deviation between the two values is within ±0.5.

Figure 5C:
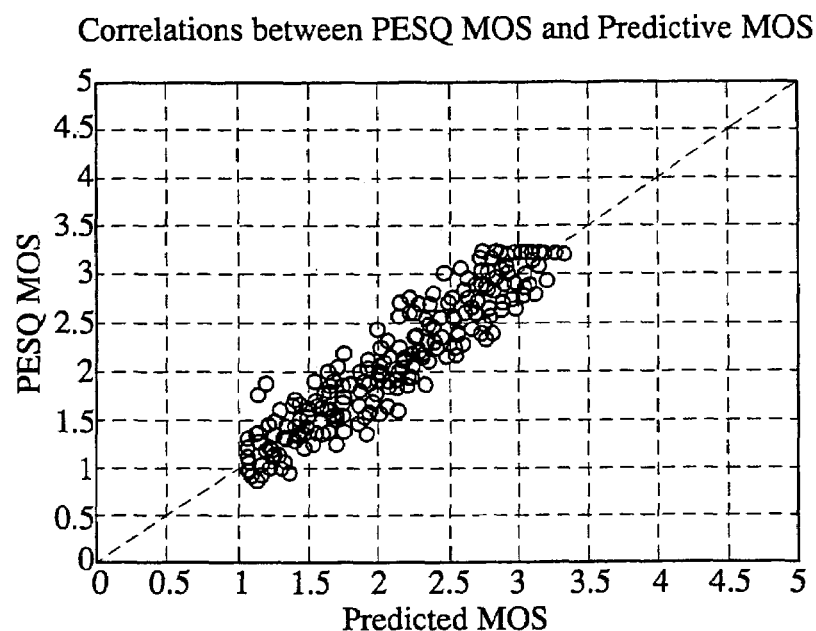

On the other hand, the following (Equation 7) is a quadratic regression analysis equation derived by using a MOS value obtained through the Equation 5 as a variable. Based on the Equation 7, the graph of FIG. 5C, which shows a relation between measuring MOS values and prediction MOS values, was obtained.

$$MOS=0.616 Y^2-1.028 Y+1.497 \quad \text{[Equation 7]}$$

in which, Y is substituted by a MOS value obtained from the Equation 5. The correlation coefficient between the measuring MOS values and the prediction MOS values in this case was 0.9505. From this, one can conclude that the prediction MOS values are substantially close to the measuring MOS values.

Figure 5D:
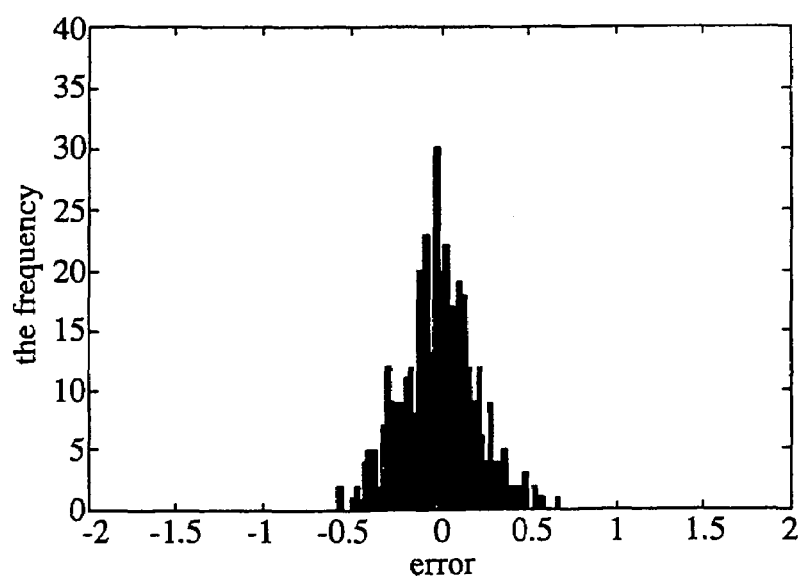

FIG. 5D is a distribution curve of deviation between measuring MOS values and prediction MOS values. As depicted in the drawing, the deviation between the two values is within ±0.5. As discussed before, in the Equation 4, the actual β values are obtained applying the measuring MOS values.

Figure 6:
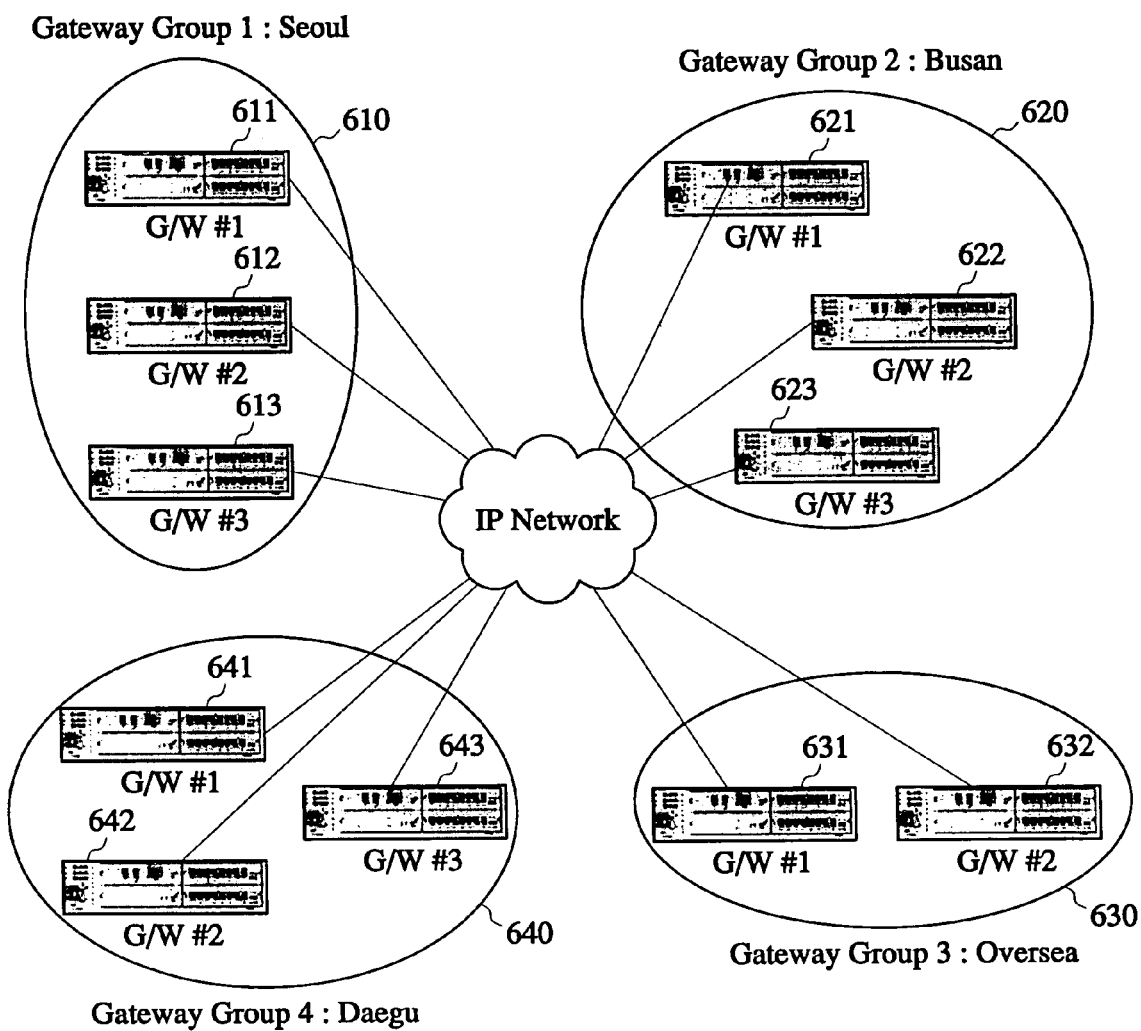
FIG. 6 is a structural diagram of a network including VoIP gateway groups to which the present invention is applied.

FIG. 6 is a structural diagram of a network including VoIP gateway groups to which the present invention is applied.

As shown in FIG. 6, there is a gateway group located in Seoul 610, Busan 620, overseas 630, and Daegu 640, respectively. When a VoIP routing was performed based on an identical access code, there exist a number of gateways 611, 612, 613, 621, 622, 623, 631, 632, 641, 642, and 643, in proportion to the number of subscribers of VoIP service. Gateways 611, 612, 613, 621, 622, 623, 631, 632, 641, 642, and 643 are grouped under the same access code, named a gateway group.

Particularly, FIG. 6 illustrates gateway groups in different areas because a trunk code is usually used as an access core for routing.

From the drawing, one can see that three gateways 611, 612, and 613 belong to Seoul group 610; three gateways 621, 622, and 623 belong to Busan group 620; two gateways 631 and 632 belong to Oversea group; and three gateways 641, 642, and 643 belong to Daegu group 640.

The gateways 611, 612, 613, 621, 622, 623, 631, 632, 641, 642, and 643 construct a routing table to be managed.

The routing table being managed by the gateways 611, 612, 613, 621, 622, 623, 631, 632, 641, 642, and 643 is composed of at least one of an access code field 701, an access code length field 702, an access code delete length field 703, an access code insert length 704, and a gateway group table field 705, as shown in FIG. 7.

The access code field 701 stores trunk numbers for respective areas, and the access code length field 703 stores length values of access codes (for example, the access code length value for an access code 051 is 3).

The access code delete field 703 stores access code length values to be deleted for deleting an access code and for routing, as a gateway routes a call (for example, the access code length value to be deleted is 3 for the access code 051).

The gateway group field 705 identifies which group a gateway with a corresponding access code belongs to.

The gateways 611, 612, 613, 621, 622, 623, 631, 632, 641, 642, and 643, as illustrated in FIGS. 8A and 8B, construct and manage respective gateway group tables. The gateway group table can include a gateway IP address field 801 or 803 wherein IP addresses of gateways are designated, and a prediction MOS value field 802 or 804 wherein prediction MOS values are designated.

The gateway 611, 612, 613, 621, 622, 623, 631, 632, 641, 642, or 643 uses a ping system to obtain prediction MOS values. More specifically, transmitting ping data to a destination gateway 611, 612, 613, 621, 622, 623, 631, 632, 641, 642, or 643, and a packet delay value and a packet loss value could be obtained therefrom.

Then, the gateway 611, 612, 613, 621, 622, 623, 631, 632, 641, 642, or 643 substitutes the Equation 5 by the jitter value, packet loss value and packet length data obtained from the ping system, and calculates a prediction MOS value, wherein the gateway 611, 612, 613, 621, 622, 623, 631, 632, 641, 642, or 643 uses standard deviation (or standard variation) of the packet delay to get the jitter value.

Meanwhile, a voice call is a two-way interaction, not a one-way interaction. Therefore, although one party might have a good voice quality, if the other party is not provided with good voice quality, the overall voice quality is not good and as a result, they cannot make a good communication.

Hence, the gateway 611, 612, 613, 621, 622, 623, 631, 632, 641, 642, or 643 transmits a status message to the other party's gateway 611, 612, 613, 621, 622, 623, 631, 632, 641, 642, or 643.

Then each of the gateways 611, 612, 613, 621, 622, 623, 631, 632, 641, 642, and 643 designates the mean value of its own prediction MOS value and a prediction MOS value being transmitted from the other party as a final prediction MOS value, and stores the final prediction MOS value in the prediction MOS value field 802 or 804 of the gateway group tables shown in FIGS. 8A and 8B.

Later, when doing a call routing to a gateway group 610, 620, 630, or 640 with an access code, the gateway 611, 612, 613, 621, 622, 623, 631, 632, 641, 642, or 643 does the call routing to another gateway 611, 612, 613, 621, 622, 623, 631, 632, 641, 642, or 643 having a maximum MOS value, the gateways 611, 612, 613, 621, 622, 623, 631, 632, 641, 642, and 643 being included in the gateway groups 610, 620, 630, and 640 that are grouped in accordance with access codes.

Figure 9:
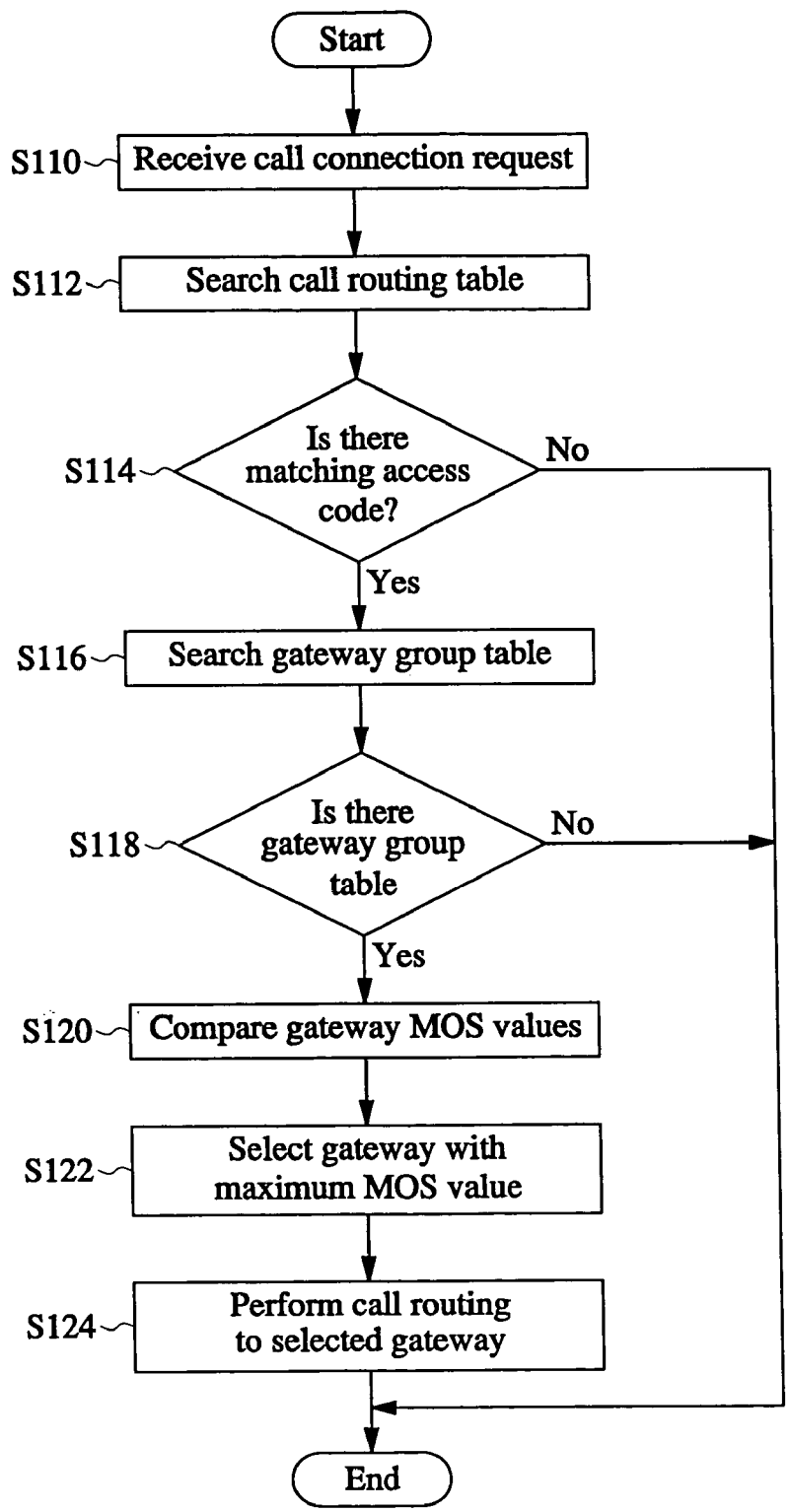
FIG. 9 is a flow chart of a call routing method based on prediction MOS value over VoIP according to a preferred embodiment of the present invention.

FIG. 9 is a flow chart of a call routing method based on prediction MOS value over VoIP according to a preferred embodiment of the present invention.

First of all, the gateway receives a call connection request signal (S110), and searches a gateway routing table (S112), and finds out whether there is an access code (S114) matching an access code accompanying the call connection request.

If it turns out that there is the matching access code, the gateway searches if a gateway group table corresponding to the access code exists (S118), and if there is, compares MOS values of the gateways in the gateway group table (S120).

Based on the comparison, the gateway selects a gateway having a maximum MOS value (S122), and performs a call routing to the selected gateway (S124).

In conclusion, the present invention can be advantageously used in that it provides best voice quality by actively responding to an organically changing network environment.

Also, according to the present invention, best voice quality is provided by selecting a best call routing path for the network environment, before setting up a call.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. A call routing method in VoIP (Voice over Internet Protocol), the method comprising steps of:
    obtaining an equation for getting a prediction MOS (Mean Opinion Score) value based on a regression analysis using a voice quality measuring system, the system having an originating side, a destination side and a network parameter emulator connecting between the originating side and destination side, each side including IP (Internet Protocol) phones, gateways and computers, where each of the computers has a built-in sound card and a voice sample for measurement of voice quality;

obtaining for each destination gateway, at an originating gateway in a gateway over VoIP network, a corresponding prediction MOS value using a ping system, by first obtaining a packet delay, a packet loss, a packet length, and a jitter value for the respective destination gateways, and applying the packet delay, the packet loss, the packet length, and the jitter value to the equation to obtain a calculated prediction MOS value for each of the destination gateways;

obtaining, at the originating gateway, a final prediction MOS value for each of the destination gateways based on the calculated prediction MOS value and a transmitted prediction MOS value transmitted from each of the plurality of destination gateways;

constructing, at the originating gateway, a gateway routing table having designated gateway group table numbers in accordance with access codes, and for constructing a gateway group table having a gateway IP address field for each destination gateway in the gateway group and a prediction MOS value field for designating the final prediction MOS value for each destination gateway in the gateway group; and when performing a call routing to a gateway group under an access code, performing, at the originating gateway, the call routing to the destination gateway with a maximum prediction MOS value, the gateway with the maximum prediction MOS value being one of the destination gateways in the gateway groups that are grouped in accordance with access codes.

2. The method according to claim 1, wherein the step of obtaining an equation comprises steps of:

transmitting, from one of the computers connected to one of the IP phones of the originating side, the voice sample for measurement of voice quality to one of the IP phones of the destination side;

encoding, by one of the gateways of the originating side, the voice sample into a packet conforming to a protocol for Internet transmission;

varying a network parameter of the Internet by the network parameter emulator for each packet received from the gateway of the originating side;

decoding the packet, by one of the gateways of the destination side, into a voice sample conforming to a protocol for a public telephone network;

measuring, at one of the computers connected to said one the IP phones of destination side, the voice sample output from said one of the gateways of the destination side to produce a measured MOS value; and deriving the equation for getting prediction MOS values based on regression analysis of the measured MOS value.

3. The method according to claim 2, wherein the step of varying a network parameter comprises varying ones of a packet delay, a packet loss or a jitter phenomenon.

4. The method according to claim 3, wherein the step of measuring utilizes a PESQ (Perceptual Evaluation of Speech Quality) technique to obtain the measuring MOS values.

5. The method according to claim 4, wherein the step of deriving comprises steps of:

deriving a simple regression analysis equation based on packet loss, packet delay, jitter and a packet length;

obtaining a correlation coefficient between a prediction MOS value that is obtained from the derived simple regression analysis equation and a measured MOS value; and if the correlation coefficient between the prediction MOS value and the measured MOS value is less than a predetermined value, deriving a quadratic regression analysis equation by using the simple regression analysis equation, and designating the quadratic regression equation as the obtained equation for getting the prediction MOS value.

6. The method according to claim 1, wherein the step a performing a call routing comprises steps of:

receiving a call connection request signal at the originating gateway;

searching the gateway routing table for an access code corresponding to an access code accompanying the call connection request;

if the corresponding access code exists, determining whether a gateway group table corresponding to the access code exists;

if the gateway group table exists, comparing prediction MOS values of the destination gateways in the gateway group table; and selecting the destination gateway with the maximum prediction MOS value, and performing the call routing to the selected destination gateway.

7. A method for predicting voice quality over an VoIP network, the method comprising steps of:

obtaining an equation for getting a prediction MOS (Mean Opinion Score) value based on a regression analysis, wherein the equation is obtained by transmitting a voice sample from a transmitting computer to a receiving computer, and the step of obtaining the equation further comprises the steps of:

varying a network parameter of an Internet by a network parameter emulator for each packet received:

transmitting the packet affected by the network parameter to the receiving computer;

measuring, at the receiving computer, the voice sample output to produce a measured MOS value using the received packet; and deriving the equation for getting prediction MOS values based on regression analysis of the measured MOS value; and obtaining, at transmitting gateways, prediction MOS values using a ping system, by first obtaining a packet delay, a packet loss, a packet length, and a jitter value for respective receiving gateways, and applying the packet delay, the packet loss, the packet length, and the jitter value to the equation for getting the prediction MOS value to obtain prediction MOS values for each of the receiving gateways.

8. The method according to claim 7, wherein the step of obtaining an equation further comprises the steps of:

encoding, by one of the transmitting gateways, the voice sample into a packet conforming to a protocol for Internet transmission; and decoding the packet, by one of the receiving gateways, into a voice sample conforming to a protocol for a public telephone network.

9. The method according to claim 8, wherein the receiving computer uses PESQ (Perceptual Evaluation of Speech Quality) procedure to obtain the measured MOS values.

10. The method according to claim 8, wherein the regression analysis comprises steps of:

deriving a simple regression analysis equation based on a packet loss, a packet jitter and a packet length;

obtaining a correlation coefficient between a prediction MOS value that is obtained from the derived simple regression analysis equation and a measured MOS value; and if the correlation coefficient between the prediction MOS value and the measured MOS value is less than a predetermined value, deriving a quadratic regression analysis equation by using the simple regression analysis equation, and designating the quadratic regression analysis equation as said equation for getting a prediction MOS value.

11. A call routing method in VoIP, the method comprising:

a first step of obtaining, at an arbitrary gateway, a final prediction MOS (Mean Opinion Score) value by obtaining a prediction MOS value from an equation for getting a prediction MOS value, receiving a prediction MOS value from each of a plurality of receiving gateways, and obtaining the final prediction MOS value based on the prediction MOS value from the equation and the prediction MOS value that is transmitted from the plurality of receiving gateways;

a second step of constructing, at the arbitrary gateway, a gateway routing table having designated gateway group table numbers in accordance with call routing access codes, and for constructing gateway group tables respectively corresponding to the gateway group table numbers each gateway group table having a gateway IP address field for each gateway in the corresponding gateway group and a prediction MOS value field for designating the final prediction MOS value respectively corresponding to each gateway IP address in the IP address field; and a third step, when performing a call routing to a gateway group according to an access code accompanying a call connection request, of performing, at the arbitrary gateway, the call routing to one of the receiving gateways having a prediction MOS value greater than the prediction MOS values of the other receiving gateways in the gateway group corresponding to the access code.

12. The method according to claim 11, wherein the third step comprises the steps of:

if a call connection request signal is received by the arbitrary gateway, searching the gateway routing table;

finding out if a matching access code exists, and if the matching access code exists, searching whether a gateway group table corresponding to the access code exists;

if the gateway group table exists, comparing the final prediction MOS values of the gateways in the gateway group table; and selecting the gateway having the greatest final prediction MOS value, and performing the call routing to the selected gateway.

* * * * *